No. 782,474. Patented February 14, 1905.

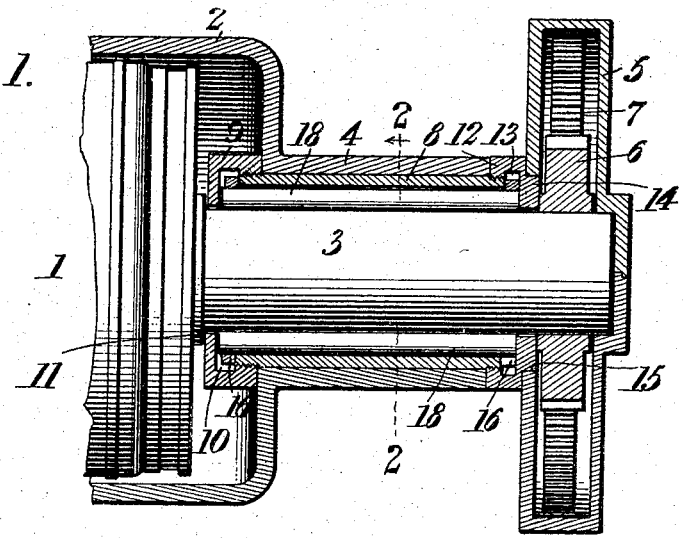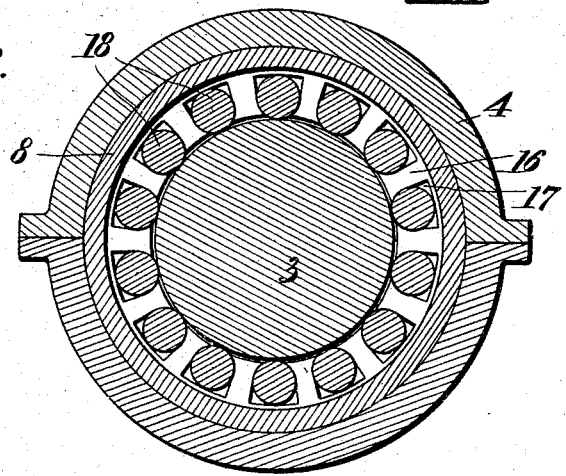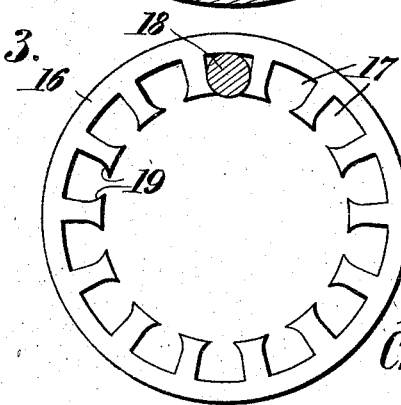

UNITED STATES PATENT OFFICE.

FREDERICK G. WARD AND CHARLES R. BUCHHEIT, OF PITTSBURG, PENNSYLVANIA.

ANTIFRICTION-BEARING FOR ARMATURE-SHAFTS.

SPECIFICATION forming part of Letters Patent No. 782,474, dated February 14, 1905.

Application filed March 26, 1904. Serial No. 200,215.

*To all whom it may concern:*

Be it known that we, FREDERICK G. WARD and CHARLES R. BUCHHEIT, citizens of the United States, residing at Pittsburg, in the county of Allegheny and State of Pennsylvania, have invented a new and useful Antifriction-Bearing for Armature-Shafts, of which the following is a specification.

This invention relates to journal-bearings, and has for its object to provide an improved antifriction-bearing particularly designed for the armature-shafts of electric motors for street-car service.

It is furthermore designed to provide for convenience in assembling the bearing in order that it may be readily applied and removed.

Another object is to obtain a maximum bearing length upon the shaft with a minimum frictional surface on the bearing of each antifriction-roller.

A still further object is to have the outer end of the bearing snugly fit the gear-case, so as to exclude dust therefrom, without employing an additional dust-guard.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a longitudinal sectional view taken through a bearing embodying the features of the present invention. Fig. 2 is a cross-sectional view thereof on the line 2 2 of Fig. 1. Fig. 3 is a detail view of one of the spacing and bearing rings for the antifriction-rollers.

Like characters of reference designate corresponding parts in each and every figure of the drawings.

For an adequate understanding of the present invention in its application to electric motors for street-railway service we have shown in the accompanying drawings a portion 1 of an armature inclosed within the usual shell 2 and having its shaft or journal 3 projected through the bearing-seat 4 of the shell. As is usual, the outer extremity of the shaft is projected into the gear-case 5 and is provided with a pinion 6, meshing with the gear 7, which is carried by the axle of the car. The parts just described are common and are now in general use, and as they form no part of the present invention they may be considerably varied without effecting the operation of the present bearing.

In carrying out this invention there is provided an open-ended cylindrical sleeve or shell 8, which is internally smooth and is externally screw-threaded at its opposite ends and is designed to fit snugly within the bearing-seat 4 of the armature shell or casing, with its screw-threaded end portions projected at the end portions of the seat. Upon the inner end of the shell or sleeve 8 and between the latter and the armature is a circular cap 9, which is internally screw-threaded, so as to be fitted to the inner screw-threaded end of the bearing-shell, and between the screw-threaded part and the back of the cap there is an inner enlarged annular channel 10, which is unthreaded and smooth. The back of the cap is provided with a reduced opening 11 to rotatably receive the inner end portion of the armature shaft or journal. At the outer end of the bearing shell or sleeve is another cap, 12, similar to the inner cap and provided with the inner annular channel 13, corresponding to the channel 10 of the inner cap. In addition the outer cap is provided with an external annular flange 14, which projects into the opening 15 in the adjacent side of the gear-case 5, so as to close the annular space between the armature-shaft and the walls of the opening 5, whereby an additional dust-guard is obviated. Within the inner annular channel of each cap is a spacer-ring 16, which is entirely independent of the bearing shell or sleeve 8 and is fitted between the adjacent end of the latter and the back of the cap. This ring is capable of rotation within the channel and is provided with a circumferential series of openings 17, preferably polygonal in shape and intersecting the inner edge of the ring, that portion of each opening which intersects the inner edge of the ring being contracted.

Interposed in the annular space between the armature-shaft and bearing shell or sleeve is an annular series of antifriction-rollers 18, each roller being of uniform diameter throughout its entire length, with its ends projected at each end of the bearing-shell and rotatably seated in the corresponding openings or bearing-seats 17 of the rings 16, whereby the rollers are maintained in spaced relation and are capable of rotating upon their axes independently of one another. It will here be noted that an extreme bearing length is obtained by projecting the antifriction-rollers at opposite ends of the bearing shell or sleeve and by mounting the ends of the rollers in polygonal bearing-seats rather than in circular seats the points of contact between the rollers and the spacer-rings are reduced to a minimum, and friction is thereby correspondingly reduced. The purpose of reducing each bearing-opening 17 where it intersects the inner edge of the ring is to present shoulders 19 for engagement with the antifriction-rollers to prevent lateral displacement thereof from the bearing seats or openings. Moreover, it is preferred to have the bearing seats or openings intersect the inner peripheral edge of the rings rather than to terminate short thereof, as the omission of material at this point reduces the bearing-surface. Another advantage of polygonal bearing seats or openings over circular seats resides in the fact that the lubricating material can more readily have access to the frictional surfaces of the bearings. In addition to preventing the antifriction-rollers from working out of the bearings or seats 17 when the entire device is set in place the contracted portions of said bearings also prevent accidental displacement of the rollers when assembling the bearing, and thereby aids materially in the setting up of the bearing.

From the foregoing description it is apparent that the bearing of the present invention is entirely complete in itself and may be fitted in place without any alteration whatsoever in the shell for the motor and the gear-case. Moreover, when fitted in place it closes the opening in the gear-case through which the extremity of the armature-shaft projects, and thereby acts as a dust-guard at this point. By projecting the antifriction-rollers beyond the ends of the bearing shell or sleeve a much longer bearing is produced than is usually afforded by the bearing-seat 4, whereby the armature-shaft is materially braced against twisting strains applied thereto by the pinion 6 when starting the motor and when running with a heavy load.

A very important feature of this invention will be appreciated by reference to Fig. 1 of the drawings, wherein it will be noted that each of the shaft-openings in the caps 9 and 12 is of a diameter less than that of the external diameter of the bearing shell or sleeve 8, and as each of the antifriction-rollers 18 is of uniform diameter from end to end and without external shoulders it is free to work endwise through the openings or seats 17 in the spacer-rings 16, wherefore end thrust is not applied to the spacer-rings, but is received by the backs of the caps 9 and 12. By this arrangement of parts the spacer-rings may be comparatively light, as there is no danger of breakage thereof by end thrusts.

Having thus described the construction and operation of our invention, what we claim as new, and desire to secure by Letters Patent, is—

1. The combination with a motor-shell having a bearing-seat, a gear-case, and an armature-shaft projected through the bearing-seat and into the gear-case, of a bearing-sleeve fitted within and projected beyond the ends of the bearing-seat and loosely embracing the armature-shaft, caps fitted to the projected ends of the bearing-sleeve and engaging the seat, the outer cap having an annular flange fitting within and closing the opening in the gear-case through which the armature-shaft passes, antifriction-rollers within the shell and projected into the caps, and spacer-rings fitted within the caps and having bearing-openings for the respective rollers.

2. The combination with a motor-shell having a bearing-seat, and an armature-shaft projected through the seat, of a bearing-sleeve fitted within the seat and projected at opposite ends thereof, caps fitted to the ends of the sleeve and bearing against the ends of the seat to hold the sleeve in position, antifriction-rollers within the sleeve and projected into the caps, and spacer-rings fitted within the caps and provided with openings receiving the respective rollers.

3. A bearing of the class described comprising an open-ended sleeve, caps embracing the ends of the sleeve and projected beyond the same, each cap having an internal annular channel located outwardly from the adjacent end of the sleeve, spacer-rings carried within the channels, and antifriction-rollers having their ends journaled upon the rings.

4. A bearing of the class described comprising an open-ended sleeve which is externally screw-threaded at opposite ends, threaded caps embracing the screw-threaded ends of the sleeve and provided with inner annular channels located between their screw-threaded portions and their backs, spacer-rings fitted within the channels, and antifriction-rollers having their ends journaled upon the spacer-rings.

5. A bearing of the class described having spacer-rings provided with polygonal bearing-openings, and antifriction-rollers journaled in said polygonal bearing-openings.

6. A bearing of the class described having spacer-rings provided with polygonal bearing-openings intersecting the inner peripheral edges of the rings, and antifriction-rollers journaled in said polygonal bearing-openings.

7. A bearing of the class described having spacer-rings provided with bearing-openings intersecting the inner peripheral edges thereof, that portion of each opening which intersects the inner edge of the ring being contracted, and antifriction-rollers journaled in the bearing-openings, the walls of the contracted portions of the openings operating to prevent lateral displacement of the rollers.

8. A bearing of the class described having spacer-rings provided with polygonal bearing-openings intersecting the inner peripheral edges thereof, that portion of each bearing-opening which intersects the inner edge of the ring being contracted, and antifriction-rollers journaled in said openings, the walls of the contracted portions of the openings constituting means to prevent lateral displacement of the rollers.

9. A bearing of the class described comprising an open-ended cylindrical sleeve which is externally screw-threaded at opposite ends, internally-screw-threaded caps embracing the screw-threaded ends of the sleeve and provided with internal annular channels located between the backs of the caps and the respective ends of the sleeve, spacer-rings fitted within the channels and provided with polygonal bearing-openings intersecting the inner edges of the rings, that portion of each opening which intersects the inner edge of the ring being contracted, and antifriction-rollers within the sleeve with their ends projected beyond the ends of the sleeve and mounted in the openings of the rings, the walls of the contracted portions of the openings constituting means to prevent lateral displacement of the rollers.

10. A bearing of the class described comprising an open-ended sleeve, and caps fitted to the ends of the sleeve and provided with corresponding openings for the reception of a shaft, one of the caps having an external annular flange surrounding the opening therein.

11. A bearing of the class described comprising an open-ended sleeve, caps fitted to the ends of the sleeves and provided with corresponding shaft-receiving openings, each of which openings is of a diameter less than that of the external diameter of the sleeve, spacer-rings located between the ends of the sleeve and the backs of the respective caps and provided with bearing-openings extending entirely through the rings, and antifriction-rollers journaled in corresponding openings of the rings and free to move endwise therethrough, the backs of the caps lying in the path of the endwise movements of the antifriction-rollers and constituting stops to receive the end thrusts of the rollers.

In testimony that we claim the foregoing as our own we have hereto affixed our signatures in the presence of two witnesses.

FREDERICK G. WARD.
CHARLES R. BUCHHEIT.

Witnesses:
JAMES G. DUNBAR,
STELLA R. BRILHART.